(12) United States Patent
Ye et al.

(10) Patent No.: US 8,894,266 B2
(45) Date of Patent: Nov. 25, 2014

(54) LIGHT GUIDE DEVICE

(75) Inventors: Zhi-Ting Ye, Miaoli County (TW);
Chin-Liang Chen, Taichung (TW);
Ming-Chuan Lin, Taichung (TW)

(73) Assignees: Dongguan Masstop Liquid Crystal Display Co., Ltd., Guangdong Province (CN); Wintek Corporation, Taichung (TW)

( * ) Notice: Subject to any disclaimer, the term of this patent is extended or adjusted under 35 U.S.C. 154(b) by 215 days.

(21) Appl. No.: 13/567,100

(22) Filed: Aug. 6, 2012

(65) Prior Publication Data

US 2013/0208506 A1    Aug. 15, 2013

(30) Foreign Application Priority Data

Feb. 14, 2012 (TW) .............................. 101104686 A (51) Int. Cl.
*F21V 7/04* (2006.01)
*F21V 8/00* (2006.01)
(52) U.S. Cl.
USPC ......................................... 362/623; 362/609
(58) Field of Classification Search
CPC ...................................................... G02B 6/002
USPC .................................................. 362/602–629
See application file for complete search history.

(56) References Cited

U.S. PATENT DOCUMENTS

| | | | |
|---|---|---|---|
| 7,073,933 B2 * | 7/2006 | Gotoh et al. | 362/624 |
| 2004/0109306 A1 * | 6/2004 | Lee | 362/31 |
| 2010/0014315 A1 * | 1/2010 | Fujimoto | 362/615 |
| 2011/0228559 A1 * | 9/2011 | Kinder | 362/608 |
| 2011/0286238 A1 * | 11/2011 | Kurata et al. | 362/606 |
| 2013/0141935 A1 * | 6/2013 | Huang | 362/602 |

* cited by examiner

*Primary Examiner* — Elmito Breval
(74) *Attorney, Agent, or Firm* — Jianq Chyun IP Office (57) ABSTRACT

A light guide device is provided. The light guide device includes a light guide plate and a light source. The light guide plate includes an incident plane, a bottom plane and a top plane. The bottom plane includes a reflective plane and an inclined bottom plane, wherein the inclined bottom plane connects the bottom of the incident plane and the reflective plane, and the inclined bottom plane is inclined relative to the reflective plane. The top plane includes an inclined top plane, a light-emitting plane and a connecting plane, wherein the inclined top plane connects the top of the incident plane and the connecting plane, the connecting plane connects the inclined top plane and the light-emitting plane, and the inclined top plane is inclined relative to the connecting surface. Furthermore, the light source is located next to the incident plane.

13 Claims, 6 Drawing Sheets

LIGHT GUIDE DEVICE

CROSS-REFERENCE TO RELATED APPLICATION

This application claims the priority benefit of Taiwan application serial no. 101104686, filed on Feb. 14, 2012. The entirety of the above-mentioned patent application is hereby incorporated by reference herein and made a part of this specification.

BACKGROUND OF THE INVENTION

1. Field of the Invention

The invention relates to a light guide device and particularly relates to a light guide device including a wedge-type light guide plate.

2. Description of Related Art

A backlight module usually includes a light guide plate that is used for guiding the scatter direction of the light generated by a light source, so as to increase the brightness and maintain the brightness uniformity of the panel, and further to transform the point light source or linear light source of the backlight module into a planar light source for the liquid crystal display panel. Therefore, the material property and the design and fabrication of the surface diffusion pattern of the light guide plate are all influential to the overall optical design and the brightness/uniformity control of the backlight module.

Figure 1:
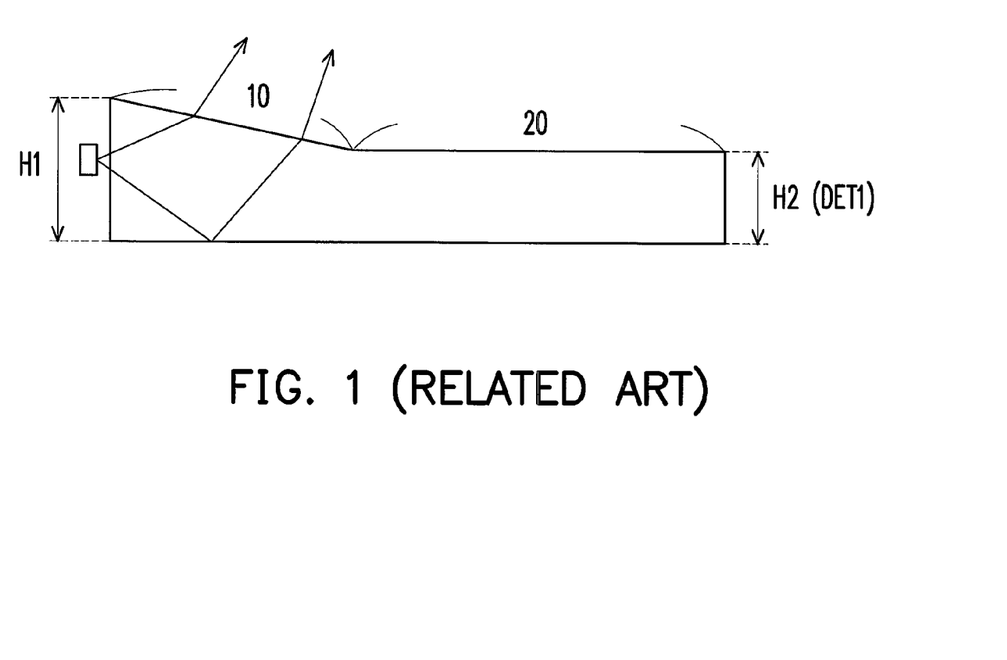
FIG. 1 is a schematic side view depicting the structure of a conventional wedge-type light guide plate.

FIG. 1 is a schematic side view depicting a wedge-type light guide plate of a conventional light guide device. In order to satisfy the demand for high-brightness backlight module and miniaturized light guide plate, the conventional light guide plate is designed to be wedge-shaped. However, most of the current wedge-type light guide plates have lower light incidence efficiency and encounter the problem that light is emitted outwards soon after reaching the light guide plates, and as a result, light leakage easily occurs outside the effective light-emitting region 20, as shown in FIG. 1. In addition, as illustrated in FIG. 1, after the thickness H2 of the conventional wedge-type light guide plate is reduced, a difference between the height H1 of the incident plane and the thickness H2 of the effective light-emitting region increases the slope of wedge bevel 10. As a result, the light is more easily emitted soon after reaching the light guide plate and makes the light leakage problem worse at the wedge bevel 10. For the above reasons, how to change the wedge bevel structure to improve light coupling efficiency and reduce light leakage has become an important issue in this field.

SUMMARY OF THE INVENTION

The invention provides a light guide device that improves light utilization efficiency and solves the problem of light leakage.

A light guide device is provided. The light guide device includes a light guide plate and a light source. The light guide plate includes an incident plane, a bottom plane, and a top plane, wherein the bottom plane includes a reflective plane and an inclined bottom plane. The inclined bottom plane connects a bottom of the incident plane and the reflective plane, and the inclined bottom plane is inclined relative to the reflective plane. The top plane includes an inclined top plane, a light-emitting plane, and a connecting plane, wherein the inclined top plane connects a top of the incident plane and the connecting plane, and the connecting plane connects the inclined top plane and the light-emitting plane. Moreover, the inclined top plane is inclined relative to the connecting plane. In addition, the light source is disposed next to the incident plane.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 2:
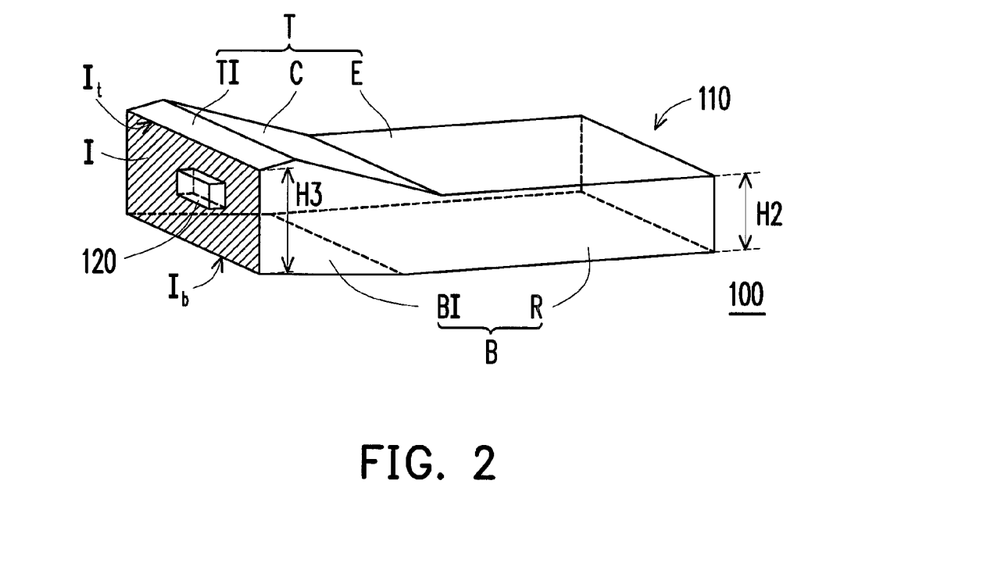
FIG. 2 is a schematic perspective view showing a bevel of a light guide plate according to an embodiment of the invention.

FIG. 2 is a schematic perspective view depicting a wedge-type light guide plate of a light guide device according to an embodiment of the invention. Referring to FIG. 2, a light guide device 100 of this embodiment includes a light guide plate 110 and a light source 120. The light guide plate 100 includes an incident plane I, a bottom plane B, and a top plane T that is opposite to the bottom plane B, wherein the bottom plane B includes a reflective plane R and an inclined bottom plane BI. The inclined bottom plane BI connects a bottom $I_b$ of the incident plane I and the reflective plane R, and the inclined bottom plane BI is inclined relative to the reflective plane R. The top plane T includes an inclined top plane TI, a light-emitting plane E, and a connecting plane C, wherein the inclined top plane TI, the light-emitting plane E, and the connecting plane C are sequentially connected and have different slopes respectively.

More specifically, the inclined top plane TI connects a top $I_t$ of the incident plane I and the connecting plane C, and the connecting plane C connects the inclined top plane TI and the light-emitting plane E. Moreover, the inclined top plane TI is inclined relative to the connecting plane C. In addition, the light source 120 is disposed next to the incident plane I.

Figure 3:
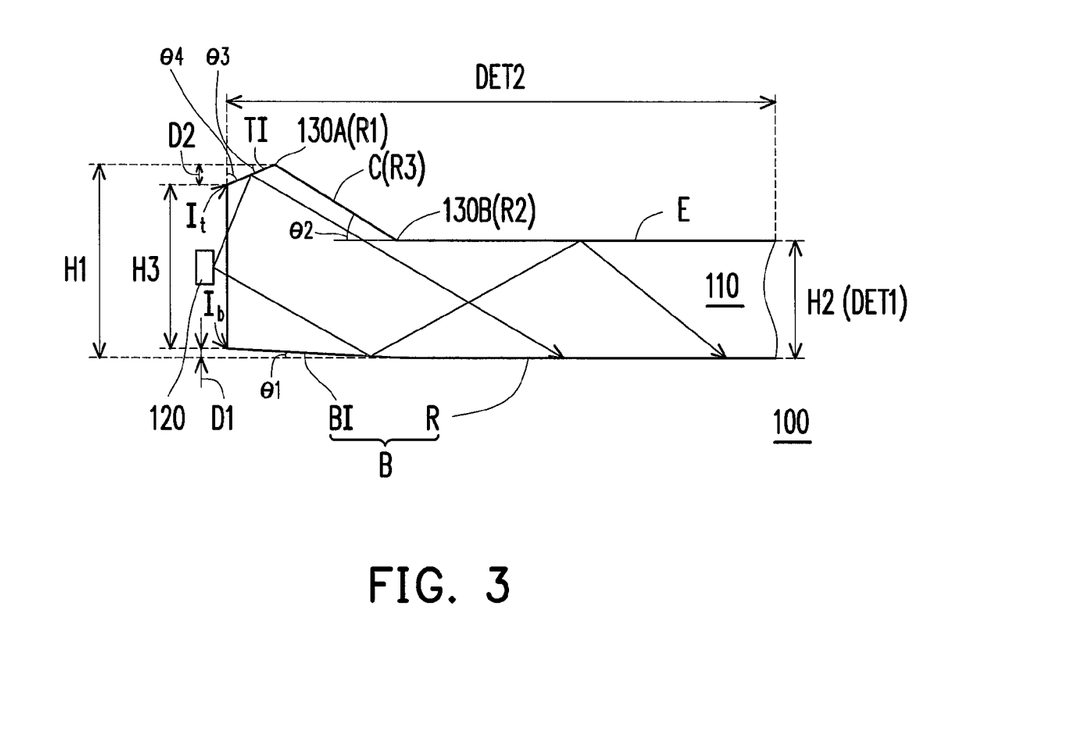
FIG. 3 is a schematic side view of a light guide plate according to an embodiment of the invention.

FIG. 3 is a schematic side view of the wedge-type light guide plate according to an embodiment of the invention. Referring to FIG. 3, the inclined bottom plane BI is inclined upwards from the reflective plane R to the bottom $I_b$ of the incident plane I. Herein, the inclined bottom plane BI and an extension direction of the reflective plane R have a first inclination angle θ1 therebetween, wherein the first inclination angle θ1 is in a range of 1~5 degrees, for example. Accordingly, when an incident light enters the bottom plane of the light guide plate from an angle that is larger than a critical angle, the incident light is totally reflected in the light guide plate properly, so as to avoid the problem that the incident light is emitted outwards immediately after entering the light guide plate. In other words, the inclined bottom plane BI is disposed to ensure that the incident light is totally reflected in a non-effective light-emitting region at a front end of the light guide plate and guided to an effective light-emitting region, and then emitted outwards via the effective light-emitting region correctly. Therefore, the light emitted by the light source is utilized effectively to prevent light leakage, and further to improve uniformity and brightness of light emission.

In addition, the inclined top plane TI is inclined downwards from the connecting plane C to the top $I_t$ of the incident plane I. That is, the inclined top plane TI is disposed to reduce a slope between the top of the incident plane and the connecting plane C. The connecting plane C and an extension direction of the light-emitting plane E have a second inclination angle θ2 therebetween, wherein the second inclination angle θ2 is in a range of 5~45 degrees, for example. Moreover, the inclined top plane TI and an extension direction parallel to the light-emitting plane E have a third inclination angle θ3 therebetween, wherein the third inclination angle θ3 is in a range of 45~85 degrees, for example. Furthermore, the inclined top plane TI and an extension direction of the incident plane I have a fourth inclination angle θ4 therebetween, wherein the fourth inclination angle θ4 is in a range of 5~45 degrees, for example. Accordingly, the conventional problem that the incident light may be easily leaked from a wedge bevel adjacent to the light source is prevented; and by totally reflecting the incident light to guide the incident light to the effective light-emitting region, the light-emitting efficiency is improved.

In addition, as shown in FIG. 3, a height D1, by which the inclined bottom plane BI is inclined upwards from the reflective plane R, is for example less than or equal to 0.5 mm; and a height D2, by which the inclined top plane TI is inclined downwards from the connecting plane C, is less than or equal to 0.5 mm. In actual application, a sum of the height D1 by which the inclined bottom plane BI is inclined from the reflective plane R, a height H3 of the incident plane I, and the height D2 by which the inclined top plane TI is inclined downwards from the connecting plane C is equal to a height H1 of the light source. In other words, even if the light guide plate is made thinner, the height of the light source is less limited by the thickness of the effective light-emitting region. Therefore, a light source with higher light-emitting efficiency can be disposed to provide an incident light with sufficient brightness to the light guide plate. In the case that the connecting plane C has a larger slope, the inclined top plane TI and the inclined bottom plane BI ensure that the incident light from the incident plane enters the light guide plate from an angle larger than the critical angle to be totally reflected, thereby decreasing light leakage, improving the overall light-emitting uniformity, and increasing the light-emitting efficiency of the effective light-emitting region. As illustrated in FIG. 3, the height H2 between the light-emitting plane to the bottom plane is less than the height H3 of the incident plane plus the height D1 by which the inclined bottom plane is inclined upwards from the reflective plane, that is H2<(H3+D1). Such a design produces a preferable effect.

In this embodiment, the connecting plane C, the inclined bottom plane BI, or the inclined top plane TI is a planar plane or can be further designed as a curved plane. Moreover, for further improving light utilization efficiency or preventing light leakage, the junctures where the inclined top plane TI, the connecting plane C, and the light-emitting plane E are connected with each other to constitute the top plane are designed as curved planes that have a specific curvature radius. To be more specific, a first juncture 130A that connects the inclined top plane TI and the connecting plane C is a curved plane that has a curvature radius R1, for example; and a second juncture 130B that connects the light-emitting plane E and the connecting plane C is a curved plane that has a curvature radius R2, for example.

Furthermore, the designer can vary the curvature radiuses R1, R2 of the first juncture 130A and the second juncture 130B and design the connecting plane C to be planar or curved, based on the size of the light source, the thickness of the effective light-emitting region, and the length of the non-effective light-emitting region of the light guide plate, etc. Herein, when the connecting plane C is a curved plane, a curvature radius R3 thereof is 3.2 mm, for example. In order to clearly illustrate how the design of the inclined top plane and the inclined bottom plane in the light guide device of the invention controls light incidence efficiency DET1 and light leakage decreasing rate DET2, Table 1 is explained below with reference to FIGS. 4A~4B and the light guide plate of FIG. 2. In Table 1, the height H1 of the light source of the light guide device is 0.5 mm; the thickness of the effective light-emitting region of the light guide plate is 0.3 mm; the height of the inclined bottom plane is D1; the height of the inclined top plane is D2; the curvature radius of the first juncture 130A that connects the connecting plane C and the top $I_t$ of the incident plane is R1; the curvature radius of the connecting plane C is R2; and the curvature radius of the second juncture 130B that connects the connecting plane C and the light-emitting plane E is R3.

TABLE 1

| H1 = 0.5 mm<br>H2 = 0.3 mm | D1<br>(mm) | D2<br>(mm) | R1<br>(mm) | R2<br>(mm) | R3<br>(mm) | Light Incidence<br>Efficiency | Light Leakage<br>DET2(W) | Light Leakage<br>Decreasing<br>Rate (%) | Light Incidence<br>Efficiency<br>Improving Rate |
|---|---|---|---|---|---|---|---|---|---|
| Reference<br>Example | x | x | x | x | x | 0.7793 | 0.0908 | — | — |
| Embodiment_1 | 0.05 | 0 | 1.5 | 0 | 3.2 | 0.8715 | 0.0284 | 68.72 | 10.57 |
| Embodiment_2 | 0.05 | 0.02 | 1.5 | 0 | 3.2 | 0.8837 | 0.0203 | 77.60 | 11.81 |
| Embodiment_3 | 0.05 | 0.04 | 1.5 | 0 | 3.2 | 0.8972 | 0.0142 | 84.36 | 13.14 |
| Embodiment_4 | 0.05 | 0.05 | 1.5 | 0 | 3.2 | 0.9010 | 0.0122 | 86.56 | 13.50 |
| Embodiment_5 | 0.02 | 0 | 1.5 | 0.3 | 0 | 0.8278 | 0.0546 | 39.86 | 5.858 |

TABLE 1-continued

| H1 = 0.5 mm<br>H2 = 0.3 mm | D1<br>(mm) | D2<br>(mm) | R1<br>(mm) | R2<br>(mm) | R3<br>(mm) | Light Incidence<br>Efficiency | Light Leakage<br>DET2(W) | Light Leakage<br>Decreasing<br>Rate (%) | Light Incidence<br>Efficiency<br>Improving Rate |
|---|---|---|---|---|---|---|---|---|---|
| Embodiment_6 | 0.02 | 0.02 | 1.5 | 0.3 | 0 | 0.8430 | 0.0467 | 48.56 | 7.55 |
| Embodiment_7 | 0.02 | 0.04 | 1.5 | 0.3 | 0 | 0.8589 | 0.0365 | 59.80 | 9.26 |
| Embodiment_8 | 0.02 | 0.05 | 1.5 | 0.3 | 0 | 0.8637 | 0.0317 | 66.18 | 9.77 |

Table 1 provides comparisons between embodiments of the invention and the conventional light guide device, wherein the Reference Example is a conventional wedge-type light guide plate, as shown in FIG. 1, which does not have the inclined top plane and the inclined bottom plane. As shown in Table 1, a light guide device which has high light incidence efficiency and low light leakage rate is obtained by changing the height D1 of the inclined bottom plane of the light guide plate, the height D2 of the inclined top plane, the curvature radius R1 of the first juncture 130A that connects the connecting plane C and the top $I_t$ of the incident plane, the curvature radius R2 of the connecting plane C, and the curvature radius R3 of the second juncture 130B that connects the connecting plane C and the light-emitting plane E. Compared with the Reference Example, Embodiments 1~8 substantially reduce light leakage and improve light incidence efficiency. Especially, the light leakage decreasing rate of Embodiment 4 is 86.56% and the light incidence efficiency improving rate of Embodiment 4 is 13.5%, which are greatly improved in comparison with the Reference Example.

Figure 4A:
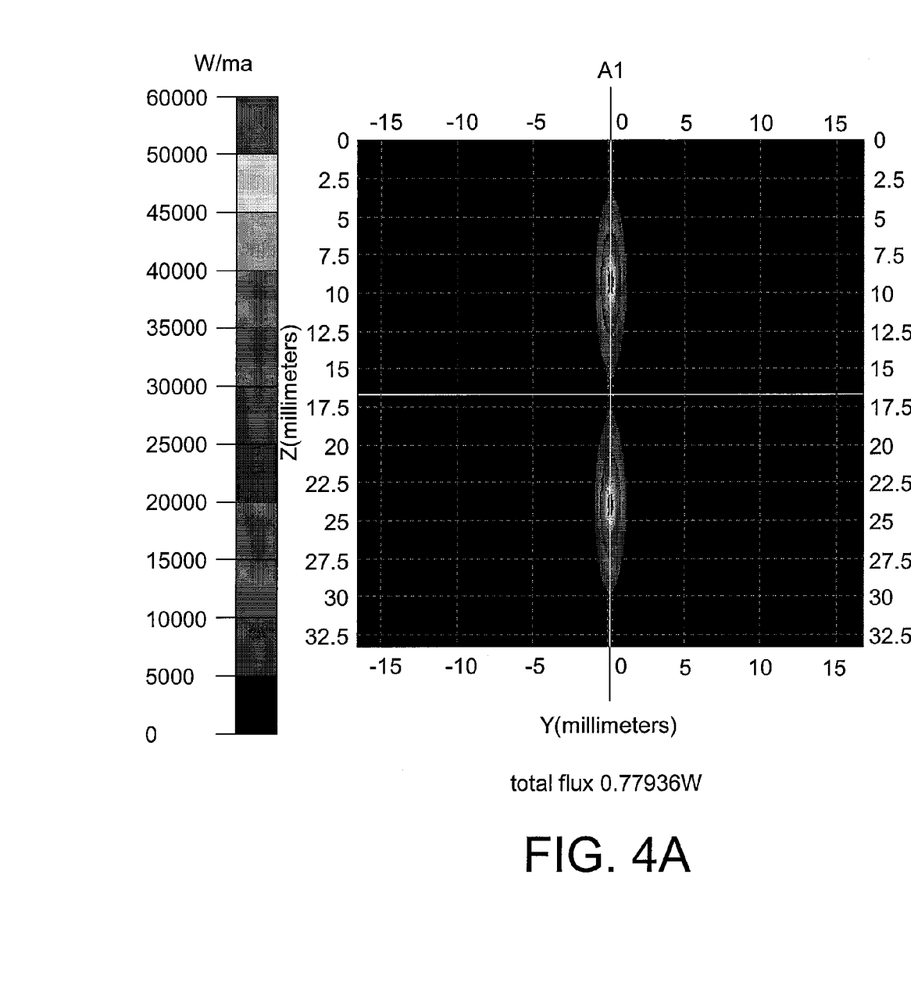
FIG. 4A is an illuminance distribution diagram of the conventional light guide device for evaluating light incidence efficiency.
Figure 4B:
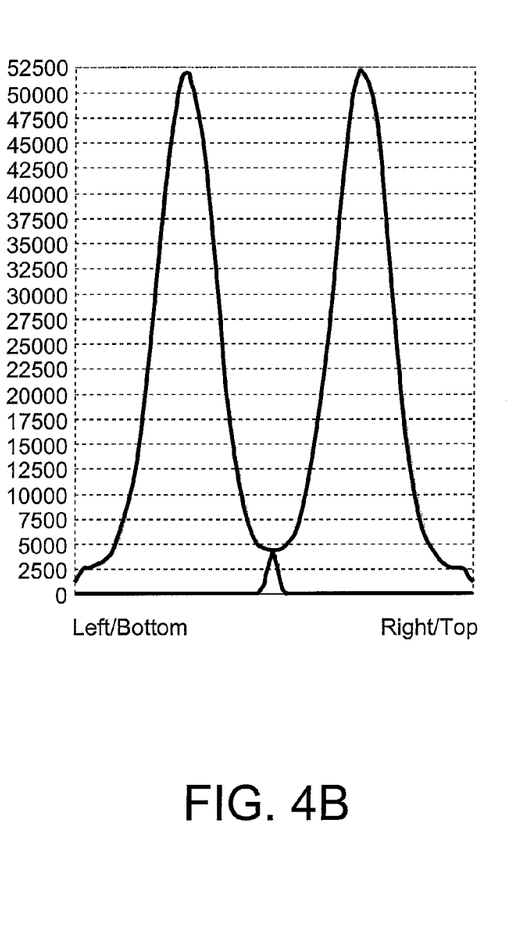
FIG. 4B is a light shape distribution diagram along the line A1 of FIG. 4A for evaluating light incidence efficiency.
Figure 5A:
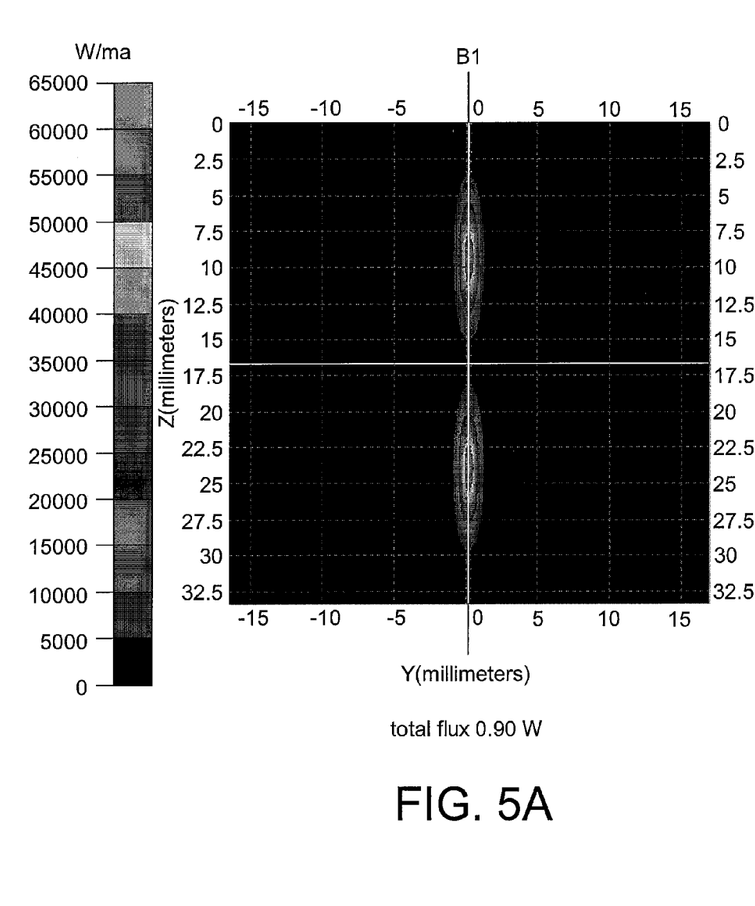
FIG. 5A is an illuminance distribution diagram of a light guide device of Embodiment 4 of Table 1 for evaluating light incidence efficiency.
Figure 5B:
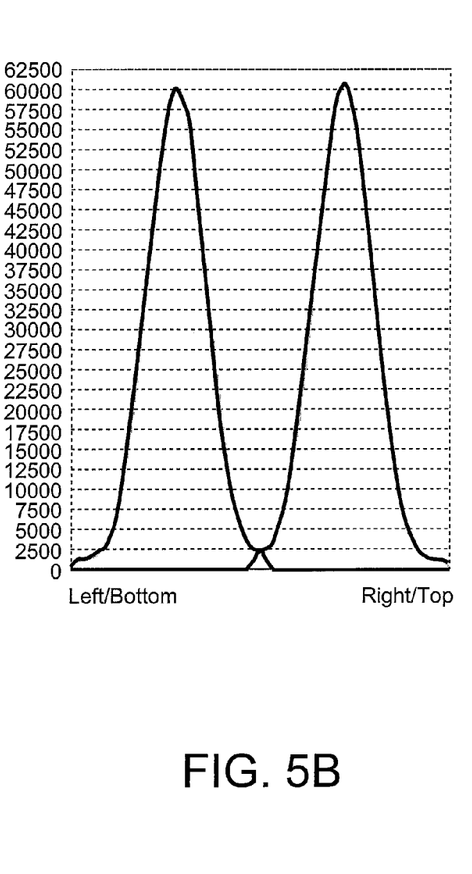
FIG. 5B is an incident-light uniformity distribution diagram of Embodiment 4 of Table 1 along the line B1 of FIG. 5A.

In addition, an illuminance distribution of the light guide device of the invention in comparison with the conventional light guide device is explained below with reference to FIGS. 4A~4B and 5A~5B. FIG. 4A is an illuminance distribution diagram of the conventional light guide device for evaluating light incidence efficiency, and FIG. 4B is a light shape distribution diagram along the line A1 of FIG. 4A for evaluating light incidence efficiency. FIG. 5A is an illuminance distribution diagram of the light guide device of Embodiment 4 of Table 1 for evaluating light incidence efficiency, and FIG. 5B is an incident-light uniformity distribution diagram along the line B1 of FIG. 5A. It is known from FIGS. 4A-4B and 5A-5B that, when compared with the conventional light guide device, the light guide device that has the light guide plate with the inclined bottom plane and the inclined top plane provides higher light-emitting efficiency and higher light-emitting uniformity.

Figure 6A:
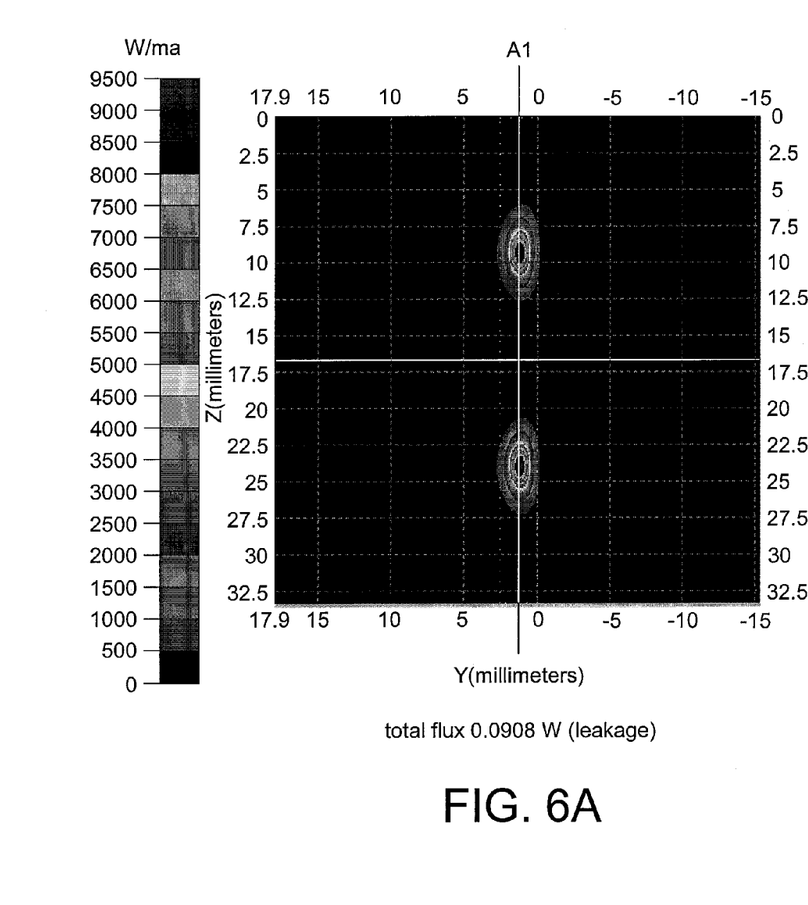
FIG. 6A is an illuminance distribution diagram of the conventional light guide device for evaluating light leakage efficiency.
Figure 6B:
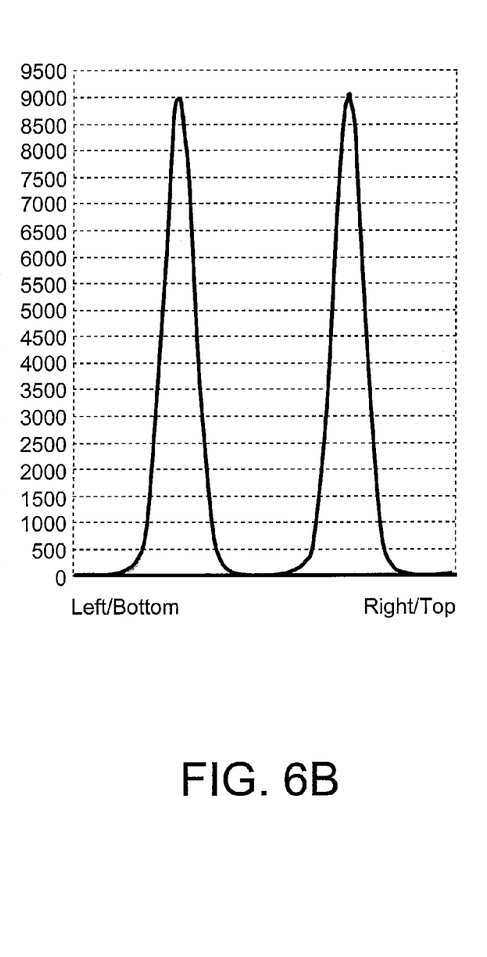
FIG. 6B is a light shape distribution diagram along the line A1 of FIG. 6A for evaluating light leakage efficiency.
Figure 7A:
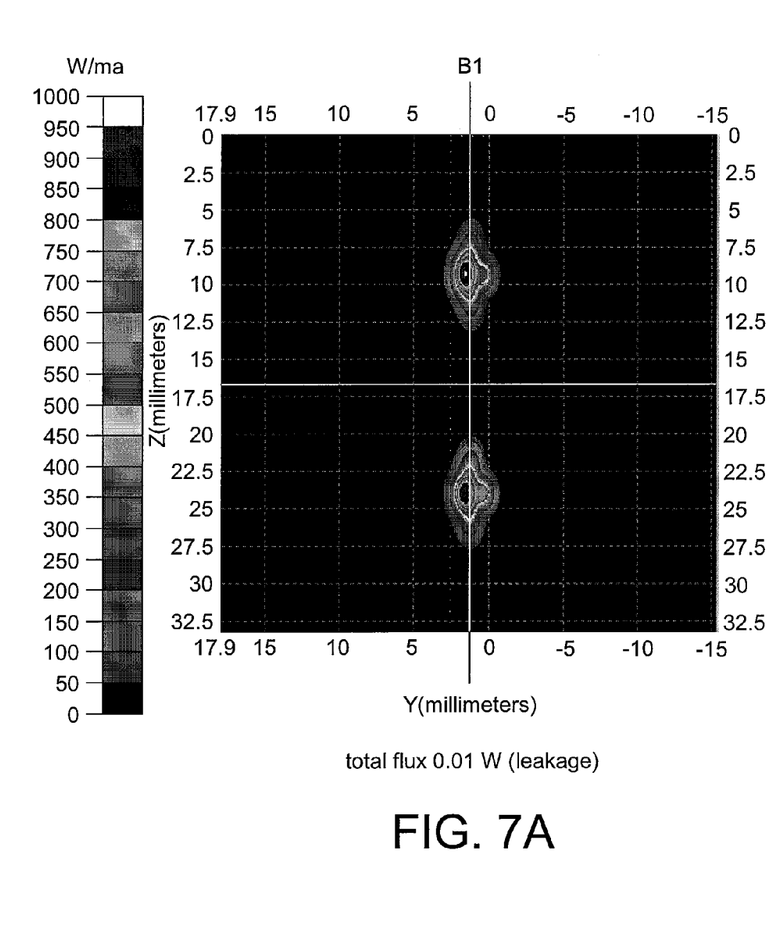
FIG. 7A is an illuminance distribution diagram of the light guide device of Embodiment 4 of Table 1 for evaluating light leakage efficiency.
Figure 7B:
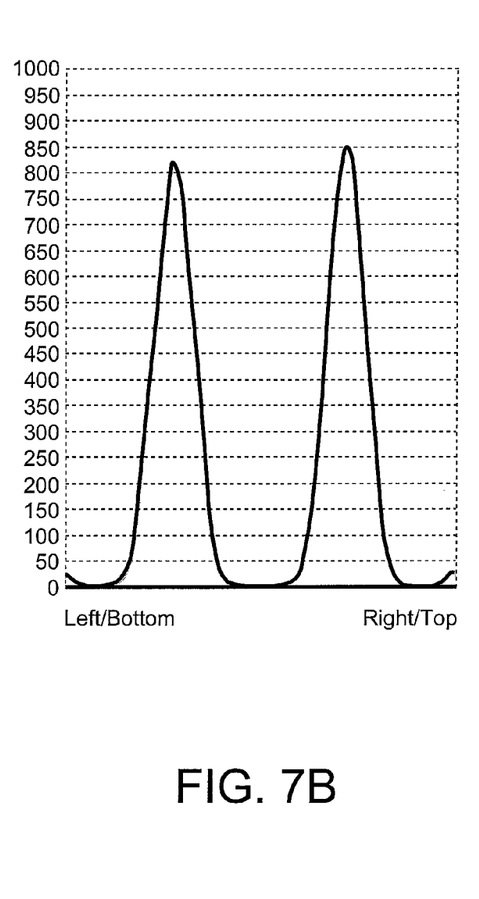
FIG. 7B is a light shape distribution diagram along the line B1 of FIG. 7A for evaluating light leakage efficiency.

On the other hand, FIG. 6A is an illuminance distribution diagram of the conventional light guide device for evaluating light leakage efficiency, and FIG. 6B is a light shape distribution diagram along the line A1 of FIG. 6A for evaluating light leakage efficiency. FIG. 7A is an illuminance distribution diagram of the light guide device of Embodiment 4 of Table 1 for evaluating light leakage efficiency, and FIG. 7B is a light shape distribution diagram along the line B1 of FIG. 7A. FIGS. 6A~6B and 7A~7B show that, in comparison with the conventional light guide device, the light guide device that has the light guide plate with the inclined bottom plane and the inclined top plane substantially reduces light leakage efficiency.

To conclude the above, because the light guide plate of the light guide device of the invention has the inclined bottom plane and the inclined top plane, the conventional problem that the incident light may be easily leaked from a wedge bevel adjacent to the light source is prevented. Moreover, in the light guide plate of the invention, the incident light is totally reflected and guided to the effective light-emitting region, and as a result light leakage is reduced and the light coupling efficiency is improved.

It will be apparent to those skilled in the art that various modifications and variations can be made to the structure of the invention without departing from the scope or spirit of the invention. In view of the foregoing, it is intended that the invention covers modifications and variations of this invention provided they fall within the scope of the following claims and their equivalents.

What is claimed is:
1. A light guide device, comprising:
a light guide plate, comprising:
an incident plane;
a bottom plane, comprising a reflective plane and an inclined bottom plane, wherein the inclined bottom plane connects a bottom of the incident plane and the reflective plane, and the inclined bottom plane is inclined relative to the reflective plane;
a top plane located opposite to the bottom plane, the top plane comprising an inclined top plane, a light-emitting plane, and a connecting plane, wherein the inclined top plane connects a top of the incident plane and the connecting plane, the connecting plane connects the inclined top plane and the light-emitting plane, and the inclined top plane is inclined relative to the connecting plane; and
a light source disposed next to the incident plane.
2. The light guide device according to claim 1, wherein the inclined bottom plane is inclined upwards from the reflective plane to the bottom of the incident plane.
3. The light guide device according to claim 2, wherein the inclined bottom plane and an extension direction of the reflective plane have a first inclination angle therebetween, and the first inclination angle is in a range of 1~5 degrees.
4. The light guide device according to claim 2, wherein a height, by which the inclined bottom plane is inclined upwards from the reflective plane, is less than or equal to 0.5 mm.
5. The light guide device according to claim 4, wherein the connecting plane and an extension direction of the light-emitting plane have a second inclination angle therebetween, and the second inclination angle is in a range of 5~45 degrees.
6. The light guide device according to claim 4, wherein a height, by which the inclined top plane is inclined downwards from the connecting plane, is less than or equal to 0.5 mm.
7. The light guide device according to claim 4, wherein a sum of the height by which the inclined bottom plane is inclined upwards from the reflective plane, a height of the incident plane, and the height by which the inclined top plane is inclined downwards from the connecting plane is equal to a height of the light source.
8. The light guide device according to claim 7, wherein a height from the light-emitting plane to the bottom plane is less than a sum of the height of the incident plane and the height by which the inclined bottom plane is inclined upwards from the reflective plane.

9. The light guide device according to claim 4, wherein, when the connecting plane is a curved plane, a curvature radius of the connecting plane is 3.2 mm.

10. The light guide device according to claim 1, wherein the inclined top plane is inclined downwards from the connecting plane to the top of the incident plane.

11. The light guide device according to claim 1, wherein, the connecting plane, the inclined bottom plane, or the inclined top plane is a planar plane or a curved plane.

12. The light guide device according to claim 1, wherein a juncture of the connecting plane and the top of the incident plane is a curved plane, and a juncture of the connecting plane and the light-emitting plane is a curved plane.

13. The light guide device according to claim 1, wherein the inclined top plane and an extension direction parallel to the light-emitting plane have a third inclination angle therebetween, and the third inclination angle is in a range of 45~85 degrees.

* * * * *